(12) United States Patent
Yang et al.

(10) Patent No.: US 10,758,075 B2
(45) Date of Patent: Sep. 1, 2020

(54) THERMAL IMMERSION CIRCULATOR

(71) Applicant: Shenzhen Chenbei Technology Co., Ltd., Shenzhen OT (CN)

(72) Inventors: Lin Yang, Shenzhen (CN); Hai Yang, Shenzhen (CN)

(*) Notice: Subject to any disclaimer, the term of this patent is extended or adjusted under 35 U.S.C. 154(b) by 293 days.

(21) Appl. No.: 15/842,940

(22) Filed: Dec. 15, 2017

(65) Prior Publication Data
US 2019/0183279 A1    Jun. 20, 2019

(51) Int. Cl.
*A47J 27/10* (2006.01)
*A47J 36/00* (2006.01)
*H05B 1/02* (2006.01)
*H05B 3/80* (2006.01)

(52) U.S. Cl.
CPC ............ *A47J 27/10* (2013.01); *A47J 36/00* (2013.01); *H05B 1/0261* (2013.01); *H05B 3/80* (2013.01)

(58) Field of Classification Search
CPC .. A47J 27/10; A47J 36/00; A47J 27/62; A47J 36/2405; H05B 3/80; H05B 1/0261; H05B 1/0269
See application file for complete search history.

(56) References Cited

U.S. PATENT DOCUMENTS

| | | | |
|---|---|---|---|
| 2013/0220143 A1* | 8/2013 | Fetterman | A47J 36/2405 99/330 |
| 2017/0150842 A1* | 6/2017 | Young | A47J 27/10 |
| 2017/0245673 A1* | 8/2017 | Peng | A47J 27/10 |
| 2018/0160841 A1* | 6/2018 | Wu | H05B 3/80 |
| 2018/0344069 A1* | 12/2018 | Chan | A47J 27/21033 |
| 2019/0124722 A1* | 4/2019 | Young | H05B 1/0252 |
| 2019/0208946 A1* | 7/2019 | Eades | A47J 27/004 |

* cited by examiner

*Primary Examiner* — Jun S Yoo
(74) *Attorney, Agent, or Firm* — Tsz Lung Yeung

(57) ABSTRACT

A thermal immersion circulator includes a main body having a receiving cavity, a partitioning member received in the main body to divide the main body into an upper portion and a lower portion, a heating element provided in the lower portion of the main body, a circulator pump provided in the lower portion of the main body, and a handle assembly. When the lower portion of the main body is immersed in the cooking cavity, the circulator pump is adapted for sucking water into the lower portion of the main body through a water inlet for being heated by the heating element. The heated water is then guided to be discharged out of the main body through a water outlet.

16 Claims, 2 Drawing Sheets

THERMAL IMMERSION CIRCULATOR

BACKGROUND OF THE PRESENT INVENTION

Field of Invention

The present invention relates to a slow cooking apparatus, and more particularly to a thermal immersion circulator which is capable of continuously and slowly providing heating and circulation to a predetermined amount of water for slow cooking purpose.

Description of Related Arts

Sous-vide generally refers to a method of cooking in which food items are vacuum-sealed in a plastic pouch and then placed in a water bath for an extended period of time. Thermal immersion circulators have been developed to continuously provide circulation and heating to a predetermined amount of water so that the food items in the pouch may be cooked in a well-circulated and heated water bath.

A disadvantage for conventional thermal immersion circulators is that their mechanical and electrical parts may come into contact with water very often. When water circulates in the thermal immersion circulators, a small amount of water may leak through built-in waterproof arrangements and come into contact with the electrical components of the thermal immersion circulators. This makes the electrical components of the conventional thermal immersion circulators defective. In more serious situations, water leak in the thermal immersion circulators may cause short-circuit and create fire hazard.

Moreover, most conventional immersion circulators utilize touch-pad control mechanism for allowing a user to set temperature and control the heating process. The touch-pad control mechanism usually comprises a plurality of control buttons provided on the main housing and a user may need to depress one or more control buttons to input operation commands or set heating temperature. However, when the user's hand is wet, depressing the control buttons may become difficult or inconvenient.

As a result, there is a need to develop a thermal immersion circulator with improved waterproof features and enhanced control mechanism.

SUMMARY OF THE PRESENT INVENTION

Certain variations of the present invention provide a thermal immersion circulator which is capable of continuously and slowly providing heating and circulation to a predetermined amount of water for slow cooking purpose.

Certain variations of the present invention provide a thermal immersion circulator which has an enhanced waterproof arrangement so as to minimize the possibility that the electrical components of the present invention being damaged by water circulating in the thermal immersion circulator.

Certain variations of the present invention provide a thermal immersion circulator comprising a control panel assembly which utilizes optical method to accomplish adjustment and control of temperature to the water circulating through the thermal immersion circulator.

Certain variations of the present invention provide a thermal immersion circulator comprising a handle assembly which may attach on a wide variety of cooking containers so as to widen the range of application of the present invention.

In one aspect of the present invention, it provides a thermal immersion circulator for a cooking container having a cooking cavity, comprising:

a main body having a receiving cavity, a water inlet, and a water outlet;

a partitioning member received in the main body to divide the main body into an upper portion and a lower portion, the water inlet and the water outlet being formed on the lower portion of the main body;

a heating element provided in the receiving cavity at a lower portion of the main body;

a circulator pump device provided in the receiving cavity at a lower portion of the main body; and a handle assembly provided on the main body, and detachably mounted on the cooking container, such that when the lower portion of the main body is immersed in the cooking cavity, the circulator pump is adapted for sucking water stored in the cooking cavity into the receiving cavity at the lower portion of the main body through the water inlet for being heated by the heating element, the heated water being guided to be discharged out of the main body through the water outlet.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
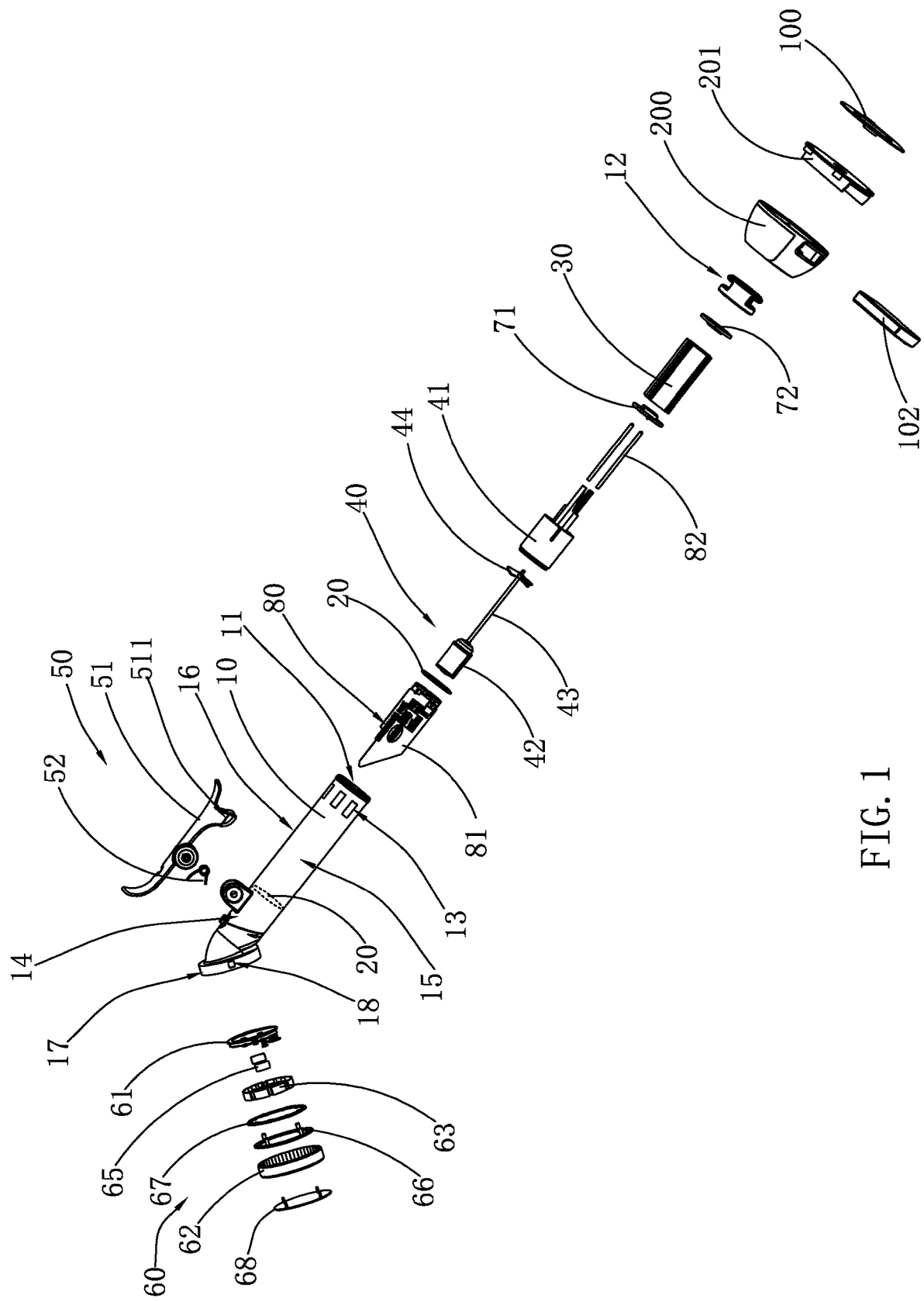
FIG. 1 is an exploded perspective view of a thermal immersion circulator according to a preferred embodiment of the present invention.
Figure 2:
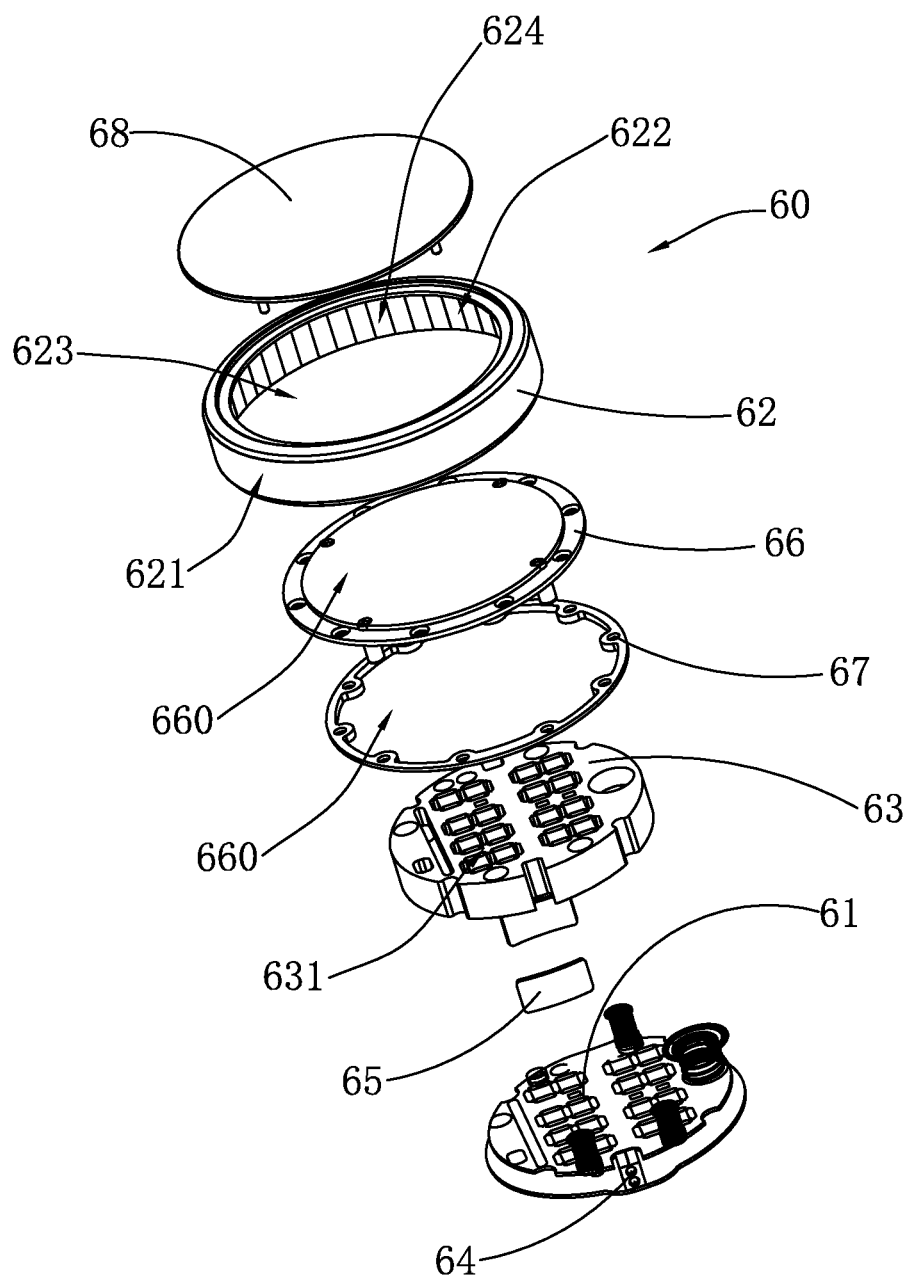
FIG. 2 is an exploded perspective view of a control panel assembly of the thermal immersion circulator according to the preferred embodiment of the present invention.

Referring to FIG. 1 to FIG. 2 of the drawings, a thermal immersion circulator according to a preferred embodiment of the present invention is illustrated. Broadly, the thermal immersion circulator may comprise a main body 10 having a receiving cavity 11, a partitioning member 20, a heating element 30, a circulator pump 40, and a handle assembly 50. The thermal immersion circulator may be utilized to facilitate slow cooking for a cooking container having a cooking cavity, by using such cooking method as "sous-vide".

The main body 10 may have the receiving cavity 11, a water inlet 12, and a water outlet 13. The main body 10 may be configured to have an elongated structure and it may be immersed in the cooking cavity.

The partitioning member 20 may be received in the main body 10 to divide the main body 10 into an upper portion 14 and a lower portion 15. The water inlet 12 and the water outlet 13 may be formed on the lower portion 15 of the main body 10. Thus, the portion of the main body 10 above the partitioning member 20 may be referred to as the upper portion 14 of the main body, while the portion of the main body 10 below the partitioning member 20 may be referred to as the lower portion 15 of the main body 10.

The heating element 30 may be provided in the receiving cavity 11 at the lower portion 15 of the main body 10. The circulator pump 40 may be provided in the receiving cavity 11 also at the lower portion 15 of the main body 10.

The handle assembly 50 may be provided on the main body 10, and detachably mounted on the cooking container, such that when the lower portion 15 of the main body 10 is immersed in the cooking cavity, the circulator pump 40 may be adapted for sucking water stored in the cooking cavity into the receiving cavity 11 through the water inlet 12 for being heated by the heating element 30. Subsequently, the heated water may be guided to be discharged out of the main body 10 through the water outlet 13.

According to the preferred embodiment of the present invention, the main body 10 may be immersed into the cooking cavity of the cooking container for performing slow cooking for the food disposed in the cooking cavity. Typically, the food may be wrapped by a pouch which is disposed in the cooking cavity which is filled with a predetermined amount of water. The thermal immersion circulator may be utilized for providing circulation of heated water in the cooking cavity so that the pouch and the food may be continuously heated by the water.

The thermal immersion circulator may further comprise a control panel assembly 60 provided on the upper portion 14 of the main body 10 for adjusting a temperature of the heated water and controlling an operation of the heating element 30 and the circulator pump 40. The control panel assembly 60 may comprise a digital display 61, an adjustment rotor 62 rotatably mounted to the digital display 61, and a supporting frame 63 mounted on the upper portion 14 of the main body 10, wherein the digital display 61 may be mounted underneath the supporting frame 63.

The control panel assembly 60 may further comprise an optical transceiver 64 arranged to emit infrared radiation in a predetermined direction. The optical transceiver 64 may also be configured to receive a reflection of the infrared radiation. On the other hand, the adjustment rotor 62 may be configured to have a ring-shaped structure and may have an outer circumferential surface 621, an inner circumferential surface 622, and a through central hole 623. The adjustment rotor 62 may also have a plurality of sensing zones 624 formed on the inner circumferential surface 622, wherein the sensing zones 624 may be configured to have alternate black-white color. Thus, each two adjacent sensing zones 624 may have two different colors (black and white in this preferred embodiment). In this sense, each particular sensing zone 624 may be sandwiched by two adjacent sensing zones 624 which may have a different color. For example, a white sensing zone 624 may be sandwiched by two adjacent black sensing zones 624. Similarly, a black sensing zone 624 may be sandwiched by two adjacent white sensing zones 624.

By simple physics, black color absorbs light and converts it into heat energy. Thus, by sensing the heat energy of the adjustment rotor 62, the optical transceiver 64 may be capable of sensing the extent of rotation of the adjustment rotor 62. The rotational movement of the adjustment rotor 62 may form a control signal for the present invention. This control signal may be transmitted to a main control circuitry 80 (described below).

The optical transceiver 64 may be mounted on the digital display 61 and may be positioned to optically communicate with the inner circumferential surface 622 of the adjustment rotor 62. On the other hand, the digital display 61 along with the optical transceiver 64 may be supported by the supporting frame 63 which may then be securely mounted in the receiving cavity 11 at the upper portion 14 of the main body 10. The digital display 61 comprise a LED or LCD display for displaying an operation status of the thermal immersion circulator, such as the temperature of the water circulating through the thermal immersion circulator. The supporting frame 63 may be overlappedly mounted on top of the digital display 61, yet the supporting frame 63 may have a light admissible portion 631 so that the information displayed by the digital display 61 may be visible to an observer through the light admissible portion 631 of the supporting frame 63. The optical transceiver 64 may be exposed to an exterior of the supporting frame 63 so that it may optically communicate with the sensing zones 624.

The control panel assembly 60 may further comprise a sealing cover 66 and a sealing ring 67 provided between the adjustment rotor 62 and the supporting frame 63 for providing enhanced waterproof sealing to the digital display 61 and the optical transceiver 64. More specifically, the sealing cover 66 may be configured as having a ring-shape structure and may be mounted on top of a peripheral portion of the supporting frame 63, while the sealing ring 67, which may be made of rubber material, may be sandwiched between the sealing cover 66 and the supporting frame 63. Each of the sealing cover 66 and the sealing ring 67 may have a central opening 660. These central openings 660 may correspond to the central hole 623 of the adjustment rotor 62. A size and shape of the sealing cover 66 may correspond to the size and shape of the sealing ring 67. Thus, the light admissible portion 631 of the supporting frame 63 may be visually observed through the central openings 660 and the central hole 623.

As shown in FIG. 2 of the drawings, the supporting frame 63 may be connected to the digital display 61 to substantially cover and protect the digital display 61, wherein the optical transceiver 64 may be exposed out of the supporting frame 63 for optically communicating with the adjustment rotor 62. On the other hand, the supporting frame 63, the digital display 61 and the optical transceiver 64 may be accommodated in the central hole 623 of the adjustment rotor 62, which may be rotatably mounted on the upper portion 14 of the main body 10.

In addition, the control panel assembly 60 may further comprise a protective cover 68 mounted on the supporting frame 63 to cover the supporting frame 63. The protective cover 68 may be configured from or made by transparent material such as glass so that a user is allowed to observe the digital display shown on the supporting frame 63. The protective cover 68 may have a circular cross-sectional shape in which a diameter of the protective cover 68 may correspond to that of the central hole 623 of the adjustment rotor 62 so that the protective cover 68 may be fittingly mounted on top of the adjustment rotor 62.

A shown in FIG. 1 of the drawings, and according to the preferred embodiment of the present invention, the main body 10 may have a top rim portion 17 formed as the peripheral rim portion of the top opening of the receiving cavity 11. The adjustment rotor 62 may be arranged to rotatably engage with the top rim portion 17 so as to rotatably mount the control panel assembly 60 on the main body 10. When the adjustment rotor 62 is mounted on the top rim portion 17, the top rim portion 17 may also be accommodated in the central hole 623, so that the top rim portion 17 is positioned in between the optical transceiver 64 and the inner circumferential surface 622 of the adjustment rotor 62. Thus, the main body 10 may further have at least one communicating window 18 formed on the top rim portion 17 while the control panel assembly 60 may further comprise at least one guiding lens 65 mounted between optical transceiver 64 and the top rim portion 17 at a position corresponding to the communicating window 18 so that the infrared radiation generated by the optical transceiver 64 may be able to reach the sensing zones 624 through the communicating window 18 and the guiding lens 65. The guiding lens 65 may be configured as being light admissible so that the infrared radiation may pass through it.

It is worth mentioning that the purpose of the communicating window 18 and the guiding lens 65 is to allow optical communication between the optical transceiver 64 and the sensing zones 624. Thus, by proper mechanical design of the optical transceiver 64 and the adjustment rotor 62, the optical transceiver 64 may mounted on the main body 10 such that it may have direct optical communication with the sensing zones 624. In such scenarios, the communicating window 18 and the guiding lens 65 may not strictly be necessary.

The circulator pump 40 may comprise a motor housing 41 mounted in the receiving cavity 11 at the lower portion 15 of the main body 10, a circulating motor 42 accommodated in the motor housing 41, an extension shaft 43 extended from the circulating motor 42, and a plurality of circulating blades 44 provided on a distal end of the extension shaft 43.

The motor housing 41 may be configured to have a waterproof structure so that when the circulating motor 42 is accommodated in the motor housing 41, the circulating motor 42 may be separated and protected from water. The extension shaft 43 may be extended from the circulating motor 42 along a longitudinal direction of the main body 10. The circulating blades 44 may be provided at a free end of the extension shaft 43. When the circulating motor 42 is actuated, the circulating blades 44 may be driven to rotate to actuate circulation of the water from the water inlet 12 to the water outlet 13.

The motor housing 41 may be mounted underneath the partitioning member 20. The motor housing 41 and the partitioning member 20 may form a sealing structure which blocks water from reaching the upper portion 14 of the main body 10.

The heating element 30 may be provided underneath the circulator pump 40 and may be in direct contact with the water sucked from the water inlet 12. The thermal immersion circulator may further comprise a first and a second heat insulator 71, 72 mounted in the receiving cavity 11 at positions above and below the heating element 30 respectively. The first heat insulator 71 and the second heat insulator 72 may provide heat insulation so that the heat generated by the heating element 30 may be prevented from damaging other components of the thermal immersion circulator, such as the circulating motor 42. The first heat insulator 71 and the second heat insulator 72 may provide effective heat insulation to the main body 10 and other components of the thermal immersion circulator, thus ensuring that the heat generated by the heating element 30 may be primarily used for heating the water circulating through the thermal immersion circulator.

The thermal immersion circulator may further comprise a main control circuitry 80 implemented on a Printed Circuit Board (PCB 81) which may be mounted in the receiving cavity 11 at the upper portion 14 of the main body 10. The main control circuitry 80 may be electrically connected to the circulator pump 40, the heating element 30 and the control panel assembly 60 for centrally controlling an operation of all these elements. The main control circuitry 80 may receive control signal from the optical transceiver 64 of the control panel assembly 60 and execute the signals or commands by driving the heating element 30 and the circulator pump 40 to operate accordingly. The status of the operation may be displayed by the digital display 61, which may also be electrically connected to the main control circuitry 80. As an example, the main control circuitry 80 may be configured and programmed to set heating of the water to 50 degrees Celsius when the adjustment rotor 62 has been turned one complete circle. Obviously, other suitable heating temperature may also be pre-programmed into the main control circuitry 80.

The thermal immersion circulator may further comprise a Negative Temperature Coefficient (NTC) sensor 82 electrically connected to the main control circuitry 80 so as to detect the temperature in the receiving cavity 11 and to stop further operation of the heating element 40 when the temperature in the receiving cavity 11 has reached a predetermined threshold. This may prevent overheating of the thermal immersion circulator of the present invention and prevent the various components from being damaged by high temperature.

The handle assembly 50 may be operatively provided on the main body 10 to detachably mount on the cooking container. The handle assembly 50 may comprise a handle 51 pivotally mounted on the upper portion 14 of the main body 10, and a resilient element 52 mounted on the handle 51 for normally exerting a biasing force against the handle to force the handle 51 biasing against an outer wall 16 of the main body 10. As shown in FIG. 1 of the drawings, the handle 51 may have a biasing portion 511 adapted to bias against an object, such as the outer wall 16 of the main body 10. When the user wishes to mount the thermal immersion circulator on the cooking container, he may need to manually and pivotally move the handle 51 so as to pivotally move the biasing portion 511 away from the outer wall 16. After that, the user may place the peripheral sidewall of the cooking container at a position between the handle 51 and the outer wall 16 of the main body 10 and then release the manual force. After that, the resilient element 52 may exert a biasing force toward the handle 51 so as to allow the handle 51 to clamp on the cooking container at the biasing portion 511. The handle assembly 50 may then clamp the main body 10 on the cooking container in such a manner that the main body 10 may be accommodated in the cooking cavity.

The thermal immersion circulator may further comprise a water collection tray 100 detachably supported by the lower portion 15 of the main body 10 for storing residual water during operation. In this preferred embodiment, the main body 10 may further have a base portion 200 provided underneath the lower portion 15, and further comprise a base cover 201 mounted on a bottom side of the base portion 200, wherein the water collection tray 100 may be detachably connected to the base portion 200. The base portion 200 may communicate with the receiving cavity 11 of the main body 10. The water collection tray 100 may be selectively detached from the base portion 200 for cleaning and removal of the residual water.

The thermal immersion circulator may further comprise a suction member 102 provided on a bottom surface of the base portion 200 of the main body 10 for selectively securing the main body 10 on an external object, such as the cooking container. The suction member 102 may help to stabilize the thermal immersion circulator when it is in operation.

The operation of the present invention is as follows: the thermal immersion circulator of the present invention may be mounted on the cooking container in such a manner that the main body may be immersed in the water stored in the cooking container. A food pouch may also be disposed in the cooking container. When the thermal immersion circulator is turned on, water may be sucked into the receiving cavity 11 at the lower portion 15 of the main body 10 through the water inlet 12. The water may then be heated to a predetermined temperature and discharged out of the receiving cavity 11 through the water outlet 13. The water in the cooking container will then be slowly heated for heating the food pouch. Water will be continuously circulating in the cooking container for achieving the optimal cooking performance. A user may turn the adjustment rotor 62 for setting the temperature of the water.

The present invention, while illustrated and described in terms of a preferred embodiment and several alternatives, is not limited to the particular description contained in this specification. Additional alternative or equivalent components could also be used to practice the present invention.

What is claimed is:

1. A thermal immersion circulator for a cooking container having a cooking cavity, comprising:
   a main body having a receiving cavity, a water inlet, and a water outlet:
   a partitioning member received in said main body to divide said main body into an upper portion and a lower portion, said water inlet and said water outlet being formed on said lower portion of said main body:
   a heating element provided in said receiving cavity at said lower portion of said main body:
   a circulator pump device provided in said receiving cavity at said lower portion of said main body;
   a handle assembly provided on said main body, and detachably mounted on said cooking container, such that when said lower portion of said main body is immersed in said cooking cavity, said circulator pump is adapted for sucking water stored in said cooking cavity into said receiving cavity at said lower portion of said main body through said water inlet for being heated by said heating element, said heated water being guided to be discharged out of said main body through said water outlet: and
   a control panel assembly provided on said upper portion of said main body, said control panel assembly comprising a digital display, an adjustment rotor rotatably mounted on said main body, an optical transceiver provided on said digital display for optically communicating with said adjustment rotor, and a supporting frame mounted on said upper portion of said main body to protect and reinforce said digital display, said adjustment rotor being arranged to be rotated to transmit control signal to said optical transceiver, and configured to have a ring-shaped structure and having an outer circumferential surface, an inner circumferential surface, a through central hole, and a plurality of sensing zones formed on said inner circumferential surface, said sensing zones being configured to have two different predetermined colors alternatively formed on said inner circumferential surface, said supporting frame, said digital display and said optical transceiver accommodating in said central hole of said adjustment rotor, wherein said supporting frame is arranged to overlappedly mounted on top of said digital display, and has a light admissible portion so that said information displayed by said digital display is kept visible through said light admissible portion, said optical transceiver being exposed to an exterior of said supporting frame to optically communicate with said sensing zones.

2. The thermal immersion circulator, as recited in claim 1, wherein said control panel assembly further comprises a protective cover mounted on said supporting frame to cover said supporting frame, said protective cover being made by transparent material and having a circular cross-sectional shape in which a diameter of said protective cover correspond to that of said central hole of said adjustment rotor.

3. The thermal immersion circulator, as recited in claim 1, wherein said main body further has a top rim portion and at least one communicating window formed on said top rim portion, said adjustment rotor being arranged to rotatably engage with said top rim portion so as to rotatably mount said control panel assembly on said main body, said control panel assembly further comprising at least one guiding lens mounted between said optical transceiver and said top rim portion at a position corresponding to said communicating window so that infrared radiation generated by said optical transceiver is capable of reaching said sensing zones through said communicating window and said guiding lens.

4. The thermal immersion circulator, as recited in claim 2, further comprising a main control circuitry implemented on a printed circuit board mounted in said receiving cavity at said upper portion of said main body, said main control circuitry electrically connecting to said circulator pump, said heating element and said control panel assembly.

5. The thermal immersion circulator, as recited in claim 3, further comprising a main control circuitry implemented on a printed circuit board mounted in said receiving cavity at said upper portion of said main body, said main control circuitry electrically connecting to said circulator pump, said heating element and said control panel assembly.

6. The thermal immersion circulator, as recited in claim 4, wherein said circulator pump comprises a motor housing mounted in said receiving cavity at said lower portion of said main body, a circulating motor accommodated in said motor housing, an extension shaft extended from said circulating motor, and a plurality of circulating blades provided on a distal end of said extension shaft, said motor housing being configured to have a waterproof structure so that when said circulating motor is accommodated in said motor housing, said circulating motor is separated and protected from water.

7. The thermal immersion circulator, as recited in claim 5, wherein said circulator pump comprises a motor housing mounted in said receiving cavity at said lower portion of said main body, a circulating motor accommodated in said motor housing, an extension shaft extended from said circulating motor, and a plurality of circulating blades provided on a distal end of said extension shaft, said motor housing being configured to have a waterproof structure so that when said circulating motor is accommodated in said motor housing, said circulating motor is separated and protected from water.

8. The thermal immersion circulator, as recited in claim 6, wherein said motor housing is mounted underneath said partitioning member, said motor housing and said partitioning member forming a sealing structure which blocks water from reaching said upper portion of said main body.

9. The thermal immersion circulator, as recited in claim 7, wherein said motor housing is mounted underneath said partitioning member, said motor housing and said partitioning member forming a sealing structure which blocks water from reaching said upper portion of said main body.

10. The thermal immersion circulator, as recited in claim 8, further comprising a first heat insulator and a second heat insulator mounted in said receiving cavity at positions above and below said heating element respectively.

11. The thermal immersion circulator, as recited in claim 9, further comprising a first heat insulator and a second heat insulator mounted in said receiving cavity at positions above and below said heating element respectively.

12. The thermal immersion circulator, as recited in claim 10, wherein said handle assembly comprises a handle pivotally mounted on said upper portion of said main body, and a resilient element mounted on said handle for normally exerting a biasing force against said handle.

13. The thermal immersion circulator, as recited in claim 11, wherein said handle assembly comprises a handle pivotally mounted on said upper portion of said main body, and a resilient element mounted on said handle for normally exerting a biasing force against said handle.

14. The thermal immersion circulator, as recited in claim 12, further comprising a water collection tray detachably supported by said lower portion of said main body for storing residual water during operation.

15. The thermal immersion circulator, as recited in claim 13, further comprising a water collection tray detachably supported by said lower portion of said main body for storing residual water during operation.

16. The thermal immersion circulator, as recited in claim 15, further comprising a negative temperature coefficient sensor electrically connected to the main control circuitry for detecting a temperature in the receiving cavity and to stopping further operation of said heating element when said temperature in said receiving cavity reaches a predetermined threshold.

* * * * *